July 9, 1929.  S. STARK  1,720,011
PROJECTION APPARATUS
Filed Aug. 28, 1924
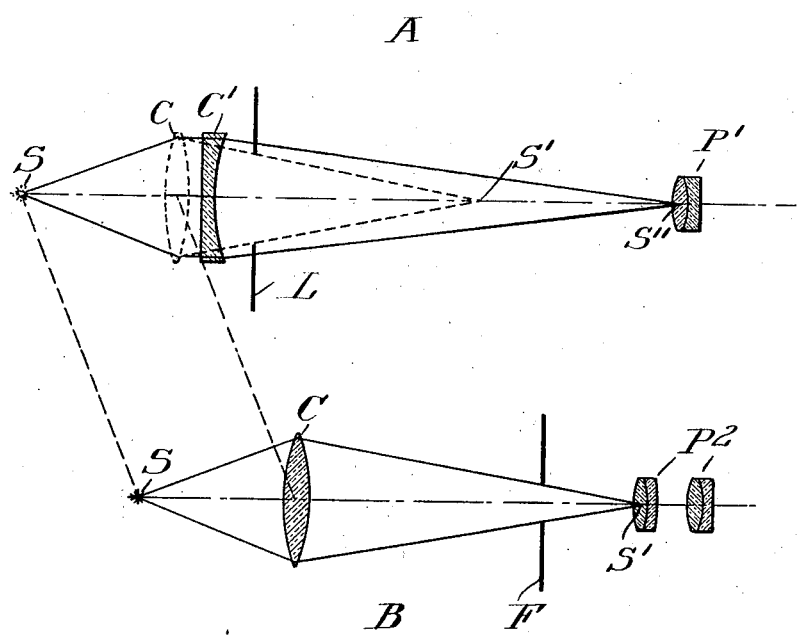
INVENTOR.
Sander Stark
BY Frederick F. Church
his ATTORNEY Patented July 9, 1929.

1,720,011

UNITED STATES PATENT OFFICE.

SANDER STARK, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

Application filed August 28, 1924. Serial No. 734,792.

This invention relates to that type of projection apparatus more particularly employed for cinematograph projection.

The object of this invention is to utilize in a convenient and economical manner a single illuminating unit for both cinematographic projection and for the projection of lantern slides without adjusting the light source with reference to the condensing system or employing a separate condensing system.

Heretofore whenever both lantern slides and cinematographs are to be projected upon a screen in some instances two complete projectors are employed, one of which is equipped particularly for the projection of lantern slides, and the other of which is equipped particularly for the projection of cinematographs. In other instances where the lantern slide projector and the cinematograph projector are side by side and in close proximity the illuminating unit employed for cinematograph projection has been shifted backwards and sidewise and sometimes only sidewise; and in this manner when used in conjunction with the usual lantern slide projection lens having an equivalent focal length of four times that of the cinematograph projection lens, the same illuminating unit has been retained for the projection of both lantern slides and cinematographs. When the latter method is employed for the projection of lantern slides, a readjustment of the light source when shifting from cinematographic projection to lantern slide projection and vice versa, is the consequent necessity. An alternative to the above practice has been to interchange the entire condensing system for one of weaker power when shifting to lantern slide projection.

My present invention provides a convenient and economical method for projecting lantern slides when employing the same illuminating unit (consisting of the condenser and light source) for lantern slide projection as is employed for cinematographic projection by shifting the illuminating unit used for cinematographs backwards and sidewise or sidewise only and into line so that the optical axis of the illuminating unit is coincident with the optical axis of the lantern slide projection lens, by the employment of a single lens of suitable negative power introduced into the cinematograph condensing system. The insertion of said negative lens obviates the necessity as heretofore for readjusting the source of illumination or interchanging the condensing system for one of weaker power when shifting from cinematographic projection to lantern slide projection.

Other objects and advantages of this invention and the way in which these objects and advantages are attained will become evident in the specification following in which reference will be made to the accompanying drawing.

In the drawing is shown a plan view of the optical system embodying my invention in which the light source S and the condensing lens or system of lenses C constituting the illuminating unit are used for the projection of both lantern slides and cinematographs.

In the drawing I have shown diagrammatically in plan two projecting systems, one indicated by A for projecting lantern slides and embodying the usual lantern slide projection lens $P_1$, and the other system B for cinematographic projection in which $P_2$ is the usual cinematograph projection lens whose focal length is one fourth that of the lantern slide projection lens $P_1$ and F is the film aperture. The lantern slide indicated by L can be a permanent adjunct of the system containing $P_1$ or it can be permanently attached to or contained in the cinematograph illuminating unit consisting of the light source S and the cinematograph condensing lens or system of lenses C. In the cinematograph projection system, the light source S is imaged by the condensing system C through the film aperture at S' in the cinematograph projection lens $P_2$.

When the illuminating unit is moved into line with the lantern slide projection lens, I interpose in the optical axis of the system and near the condenser C a negative lens C' of such power that the image $S_1$ of the light source S is shifted to $S_{11}$ in the lantern slide projection lens $P_1$ which is the well known and necessary condition for satisfactory lantern slide projection.

The means employed for supporting and shifting the illuminating system may be of the usual kind and the negative lens may be a permanent part of the lantern slide projector or may be mounted on the lamp house and movable into and out of the optical axis of the condenser.

In this specification where I have used the term lens, it will be understood that so far as my invention is concerned these may be single lenses or systems comprising two or more components.

It is understood that I have described but one specific form of my invention and that other forms are possible and adequate, which do not in the least depart from the spirit of my invention. For example, I have shown the lens C' to be of plano concave form. The form of this lens C' can just as well be double concave or even concavo convex. While I have shown the lens C' positioned in front of the condensing system C, I consider it within the scope of my invention if lens C' is placed to the rear of condensing system C as the same results are produced, although it is generally more convenient to place it in front as there the illuminating unit can if necessary be constructed independently of either projecting system.

I claim as my invention:

1. Optical projection apparatus comprising a cinematograph projector, a slide projector, a common source of illumination and condenser movable as a unit relatively to the projectors into proper focal positions for use with either projector selectively, and a negative lens operatively associated with the slide projector and in proximity to the condenser when the unit is in use with the slide projector for imaging the illumination source in the slide projector at the proper focal distance.

2. Projection apparatus comprising an objective for projecting cinematographs, an objective for projecting slides, a negative lens positioned with its axis in alinement with the axis of said last named objective, and an illluminating unit comprising a light source and a condensing lens, said unit being movable so that it may be selectively positioned in cooperative relation with either of said objectives.

3. Projection apparatus comprising an objective for projecting cinematographs, a lens system for projecting lantern slides, said system comprising an objective and a negative lens spaced from said objective, and an illuminating unit comprising a light source and a condensing lens, said unit being movable and adapted to be positioned selectively to send light rays either through said first named objective or through said system.

4. Projection apparatus comprising an objective for projecting cinematographs, an objective for projecting lantern slides, a negative lens having its axis in alinement with the axis of said last named objective, and an illuminating unit comprising a light source and a condenser, said unit being movable and adapted to project light rays selectively through either of said objectives, said negative lens being located between said last named objective and the position occupied by said unit when it is cooperating with said last named objective.

SANDER STARK.